United States Patent [19]

Kawabata

[11] Patent Number: 5,234,324
[45] Date of Patent: Aug. 10, 1993

[54] EXTRUDER FOR HIGHLY FOAMED PLASTIC MATERIAL HAVING A REDUCED DIAMETER MIXING SPACE FOR INTRODUCING AN INERT FOAMING AGENT

[75] Inventor: Saburo Kawabata, Kanagawa, Japan

[73] Assignee: Sumitomo Electric Industries, Ltd., Osaka, Japan

[21] Appl. No.: 653,089

[22] Filed: Feb. 8, 1991

[30] Foreign Application Priority Data

Feb. 9, 1990 [JP] Japan .................................. 2-28428

[51] Int. Cl.$^5$ .............................................. B28B 1/50
[52] U.S. Cl. ...................................... 425/4 C; 264/50;
264/174; 425/114; 425/200; 425/205; 425/208
[58] Field of Search .................... 264/349, 50, 174;
366/90, 319, 75, 76; 425/4 R, 4 C, 378.1, 203,
114, 200, 205, 208

[56] References Cited

U.S. PATENT DOCUMENTS

| | | | |
|---|---|---|---|
| 3,160,688 | 12/1964 | Aykanian et al. | 264/53 |
| 3,287,477 | 11/1966 | Vesilind | 425/4 C |
| 3,344,215 | 9/1967 | De Witz et al. | 425/4 C |
| 3,374,300 | 3/1968 | Azuma | 425/4 C |
| 3,806,099 | 4/1974 | Gallard et al. | 259/192 |
| 3,806,569 | 4/1974 | Gallard et al. | 425/4 C |
| 3,843,757 | 10/1974 | Ehrenfreund et al. | 425/208 |
| 3,981,649 | 9/1976 | Shimano et al. | 425/4 C |
| 4,029,300 | 7/1977 | Morishima et al. | 366/75 |
| 4,049,897 | 7/1978 | Tukano et al. | 425/4 C |
| 4,107,354 | 8/1978 | Wilkenloh et al. | 264/50 |
| 4,376,741 | 3/1983 | Stenzel | 425/4 C |
| 4,746,478 | 5/1988 | Fujisaki et al. | 264/53 |
| 4,877,840 | 10/1989 | Chu | 425/379.1 |
| 4,940,329 | 7/1990 | Dienst | 366/75 |

FOREIGN PATENT DOCUMENTS

| | | |
|---|---|---|
| 1201041 | 9/1965 | Fed. Rep. of Germany . |
| 1554773 | 7/1969 | Fed. Rep. of Germany . |
| 3316838 | 11/1984 | Fed. Rep. of Germany . |
| 1570371 | 6/1969 | France . |
| 2585282 | 1/1987 | France . |
| 56-17237 | 2/1981 | Japan . |
| 56-60234 | 5/1981 | Japan . |

OTHER PUBLICATIONS

Dr. F. Hensen et al., "Handbuch der Kunststoff-Extrusionstechnik, II, Extrusionsanlagen", Carl Hanser Verlag, Munich, 1986, pp. 469-470, table 2.

Primary Examiner—Jay H. Woo
Assistant Examiner—Robert B. Davis
Attorney, Agent, or Firm—Cushman, Darby & Cushman

[57] ABSTRACT

The present invention provides an extruder for highly foamed plastic material for coating a central conductor of a coaxial insulated cable with an insulator made of a mixture of a plastic material, preferably polyethylene, and an inert gas, such as nitrogen gas, to serve as a foaming agent. An inert gas is introduced approximately halfway down the extruder through a lead-in portion. At the lead-in portion of the extruder is a vent portion wherein the screw is provided with a plurality of stirring blades extending radially from the screw toward the inner surface of the extruder. These stirring blades provide a mechanism by which the inert gas is mixed thoroughly into the plastic material. The above invention provides an apparatus for producing an insulating material in which an inert gas (such as nitrogen), rather than hydrocarbon chloride fluoride, is used as a foaming agent, thus avoiding potential harm to the ozone layer.

2 Claims, 1 Drawing Sheet

EXTRUDER FOR HIGHLY FOAMED PLASTIC MATERIAL HAVING A REDUCED DIAMETER MIXING SPACE FOR INTRODUCING AN INERT FOAMING AGENT

BACKGROUND OF THE INVENTION

The present invention relates to an extruder for highly foamed plastic material for coating a central conductor of a coaxial insulated cable or the like with an insulator of for example a highly foamed plastic material, preferably polyethylene, having at least a 70% or more foaming rate.

Conventionally, as the method for producing a coaxial insulated cable of the kind described above, there is a known technique in which hydrocarbon chloride fluoride (flon) or the like is used as a foaming agent in two extruders connected to each other. The foaming agent is led into the first-stage extruder at its middle portion so as to be kneaded with a plastic material such as polyethylene or the like, and then the kneaded plastic material is sent to the second-stage extruder so as to be further kneaded and the highly foamed plastic material is applied onto a central conductor as a coating.

FIG. 4 (Prior Art) is an external view showing an example of a screw used in the conventional first-stage extruder.

Here, the screw having a total length L is constituted by a feed portion 2, a kneading portion 3, a metering portion 4, a vent portion 5, a kneading portion 3', and a metering portion 4' having lengths $l_1$, $l_2$, $l_3$, $l_4$, $l_2'$, and $l_3'$ respectively.

A foaming-agent lead-in portion 6 is provided in a cylinder at a portion where the vent portion 5 of the screw 1 is positioned. The foaming-agent lead-in portion 6 has a structure such as a poppet valve, which is not illustrated in detail in the drawing, for preventing a plastic material in the cylinder from flowing back.

The pellet-like plastic material supplied from a portion (a) of the cylinder is kneaded through the lengths $l_1$, $l_2$, and $l_3$, further kneaded through the lengths $l_2'$, and $l_3'$ together with a foaming agent such as hydrocarbon chloride fluoride (flon) poured under volume-regulation at the vent portion 5, and then led into a second-stage extruder 10 (FIG. 3).

As portrayed in a schematic view in FIG. 3, the foaming agent and the mixed plastic material which are led into the second-stage extruder 10 are further kneaded so that the foaming agent is equally dispersed in the plastic material, and the thus kneaded highly foamed plastic material is applied onto a central conductor 16 as a coating therefor by a crosshead 15 constituted by a nipple and a die positioned at a top end of the second-stage extruder 10, thereby producing a highly foamed plastic insulated wire-like body 17.

Conventionally, in extruding a plastic material such as foamed polyethylene or the like in which hydrocarbon chloride fluoride (flon) or the like is used as a foaming agent, the foaming agent performs an expanding action onto the plastic material, so that the conventional screw performs sufficient kneading.

Recently, however, the theory has been advocated that hydrocarbon chloride fluoride, or flon, destroys the ozone layer, causing destruction of the ozone layer on a world-wide scale. Thus, in achieving a method for extruding a highly foamed plastic material using an inert gas (for example, a nitrogen gas) as a foaming agent, a conventional method for extruding a highly foamed plastic material cannot be used because a stable consistent foaming state is not achieved. When such a method is used for extruding a highly foamed plastic material having an inert gas, both the electrostatic capacitance required as a characteristic of cables and the outer diameter of the cables vary extremely. Accordingly, an extrusion method for extruding highly foamed plastic material using an inert gas as a foaming agent and in which the foaming state is consistent and stable has been required.

SUMMARY OF THE INVENTION

In order to solve the above problems, as a result of various investigations, the present inventor has completed the present invention in which a plurality of stirring blades are provided in an extruder for highly foamed plastic material at its vent portion so that a highly foamed plastic material such as polyethylene or the like and an inert gas as a foaming agent can be evenly mixed with each other to thereby make it possible to stably extrude an insulator in an even, consistently foaming state.

That is, according to the present invention, the extruder for highly foamed plastic material using an inert gas, such as a nitrogen gas, as a foaming agent for producing an electric wire insulated with highly foamed polyethylene having a foaming rate not lower than 70%, comprises: a cylinder; a foaming-agent lead-in portion provided in the cylinder at its middle portion so as to allow the foaming agent to enter the cylinder; a screw provided in the cylinder with a vent portion which may be tapered to provide a mixing space formed at a position where the foaming agent enters through the foaming-agent lead-in portion; and a plurality of stirring blades provided on the cylinder at the vent portion, the stirring blades having effective height extending to the vicinity of an inner wall of the cylinder.

The extruder for highly foamed plastic material mentioned above has a further feature in that the extruder is formed by a pair of first-stage and second-stage extruder units connected to each other, and in that the foaming-agent lead-in portion as defined above is provided in the first-stage extruder unit so that the foaming agent is led in at the middle portion of the first-stage extruder unit, and the screw having the shape and structure as defined above is provided in the first-stage extruder unit.

DETAILED DESCRIPTION OF THE PREFERRED EMBODIMENTS

Figure 1:
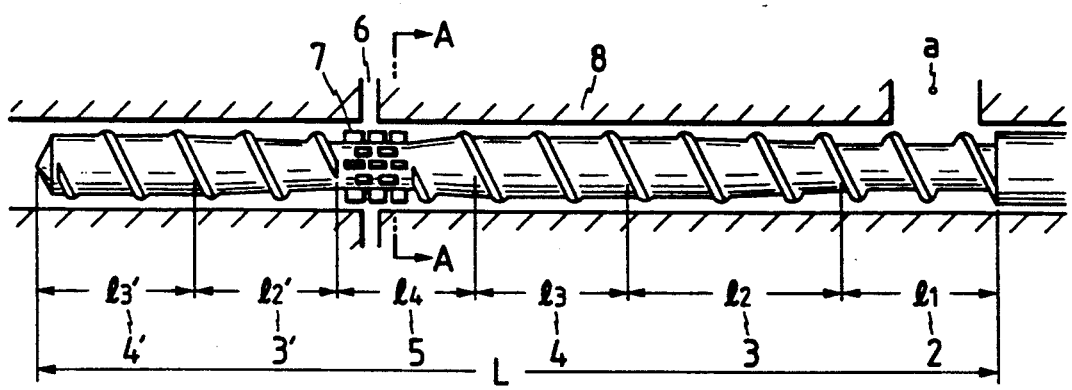
FIG. 1 is a side section showing an extruding screw of a first-stage extruder unit of an extruder for highly foamed plastic material, as an embodiment of the present invention.

FIG. 1 is a side sectional view showing an embodiment of the present invention. In particular, FIG. 1 shows an extruding screw of a first-stage extruder unit of an extruder for highly foamed plastic material in which an inert gas is used as a foaming agent.

Figure 2:
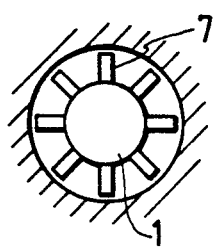
FIG. 2 is a sectional view taken on a line A—A of FIG. 1.

FIG. 2 is a sectional view taken on a line A—A of FIG. 1 and showing a structure of a vent portion of the screw 1.

As shown in FIGS. 1 and 2, the present invention is proposed so as to solve the disadvantage in the conventional art and an object thereof is to provide an extruding screw 1 with a vent portion 5, which may be tapered and which is circumferentially provided with a plurality of stirring blades having an effective height extending to the vicinity of an inner wall of a cylinder 8. The stirring blades are provided in place of a flight of the screw threads in the vent portion 5.

Figure 3:
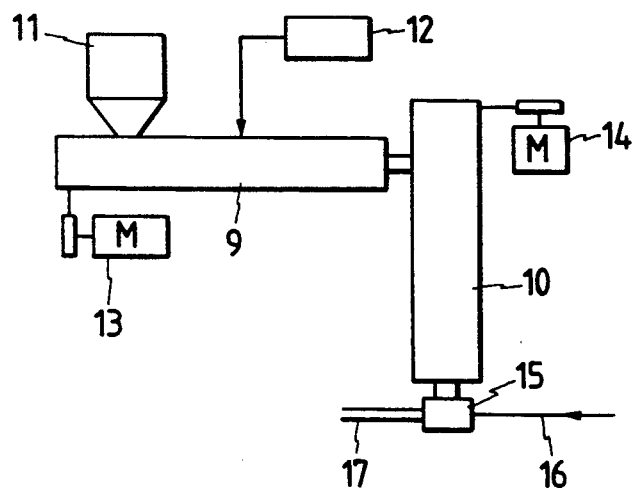
FIG. 3 is a schematic view showing another embodiment of the present invention of the extruder for highly foamed plastic material constituted by a pair of extruder units.
Figure 4:
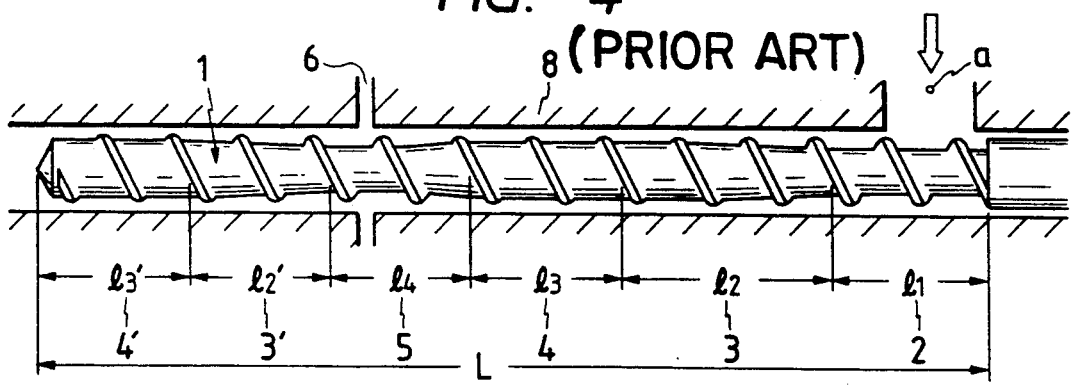
FIG. 4 (Prior Art) is a side section showing an example of a conventional extruding screw.

FIG. 3 is a schematic view showing another embodiment of the present invention of the extruder for highly foamed plastic material constituted by a pair of extruder units.

Next, the operation will be described. An inert gas having predetermined pressure is led from an inert gas lead-in portion which is formed at the vent portion, the inert gas being fed into a completely melted plastic material through the lengths $l_1$ (first tapered plasticating portion $l_2$ (first metering portion) and $l_3$ (second tapered portion) of the screw 1. The fed inert gas is physically mixed with the plastic material by a plurality of stirring blades 7 provided in the vent portion 5 with the stirring blades having an effective height extending to the vicinity of the inner wall of the cylinder 8. The mixture is further kneaded through the lengths $l_2'$ (third tapered portion), and $l_3'$ (second metering portion), so that the inert gas is equally dispersed in the plastic material in the form of fine inert-gas bubbles to thereby obtain a stable extruding state in which an even, consistently foaming state is achieved.

Here, variations in the characteristics of cables coated with a highly foamed plastic material depending on the difference in screw structure are as shown in the following Table 1.

TABLE 1

| Forming agent | Screw | Outer diameter (mm) | Outer diameter variation (mm) | Electorostatic capacity variation (PF/m) |
|---|---|---|---|---|
| Hydrocarbon chloride fluoride | Conventional screw | 8.5 | ±0.03 | ±0.05 |
| Inert gas (nitorogen gas) | Conventional screw | 8.5 | ±0.2 | ±0.3 |
| | Screw of the invention | 8.5 | ±0.05 | ±0.08 |

It is apparent from the result of Table 1 that the extruding screw according to the present invention has an extrusion performance equivalent to that of the extruding method in which hydrocarbon chloride fluoride (flon) is used as a foaming agent.

Low-density polyethylene, middle-density polyethylene, high-density polyethylene, polypropylene, butyl rubber, or the like, or a mixture of two or more kinds of the polyolefin-group resin can be used as the highly foamed plastic material, and particularly polyethylene resin and polypropylene resin are preferrably used.

Further, as the highly foamed plastic material according to the present invention, the polyolefin resin may be mixed with a small quantity of other thermoplastic resin or rubber.

The inert gas used as a foaming agent in the present invention may be, typically, nitrogen, argon, carbon dioxide, or the like. There is no specific requirement of which one so long as the inert gas is in a gaseous state under the conditions of temperature not lower than 100° C. and pressure not higher than 30 kg/cm².

In foaming, a small amount of bubble nucleus forming agent such as azodicarbonamide or the like may be mixed with the foaming plastic material in advance.

As described above, according to the present invention, in the extruder for extruding the highly foamed plastic material using an inert gas as a foaming agent, the flight of the screw thread at the vent portion is removed and a plurality of stirring blades with an effective height extending to the vicinity of the inner wall of the cylinder are provided around the circumference of the screw in a radial direction in place of the flight of screw thread, so that it becomes possible to physically mix and mull an inert gas and a plastic material evenly with each other. Accordingly, a stable extruding state in which the foaming state is consistent can be obtained.

According to the present invention, it is possible to obtain extremely good effects in that the foaming agent such as the conventional hydrocarbon chloride fluoride or the like which may destroy the ozone layer in the air may be replaced with an inert gas which does not cause any environmental problem at all by replacing the conventional screw with a relatively inexpensive screw according to the present invention. Besides avoiding environmental problems, the cost of raw material can also be reduced.

Accordingly, the present invention is effectively used in the cable producing field in which a highly foamed plastic material is applied as an insulator coating onto, for example, a central conductor of an insulated coaxial cable.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An extruder for highly foamed plastic material using an inert gas as a foaming agent comprising:
    a cylinder having a foaming-agent lead-in portion through which said foaming agent enters into said cylinder, said cylinder defining a cavity;
    a screw extending through said cavity for propelling plastic material through said cavity as said screw rotates, said screw comprising a first tapered plasticating portion, a first metering portion, a second tapered portion, a vent portion, a third tapered portion and a second metering portion,
        said vent portion comprising (1) a cylindrical section having a decreased diameter relative to a diameter of said screw at said first metering and second metering portions and (2) a flight of screw thread removed to form a mixing space adjacent to said lead-in portion,
        said first tapered plasticating portion comprising a cylindrical section of gradually increasing diameter as it extends towards said first metering portion,
        said first metering portion comprising a cylindrical section of constant diameter and extending from said first tapered plasticating portion toward said second tapered portion, said second tapered portion comprising a cylindrical section of gradually decreasing in diameter as it extends from said first metering portion toward said vent portion, said third tapered portion comprising a cylindrical section of gradually increasing diameter as it extends from said vent portion toward said second metering portion;

said second metering portion comprising a cylindrical section of constant diameter; and a plurality of stirring blades in said mixing space extending radially around the circumference of said decreased diameter cylindrical section of said screw toward an inside surface of said cylinder for stirring said foaming agent into said plastic material as said plastic material is moved through said cavity.

2. An extruder system for highly foamed plastic material comprising:

a first-stage extruder unit including:

a first cylinder having a foaming-agent lead-in portion through which said foaming agent enters into said first cylinder, said first cylinder defining a cavity;

a first screw extending through said first cavity for propelling plastic material through said first cavity as said first screw rotates, said first screw comprising a first tapered plasticating portion, a first metering portion, a second tapered portion, a vent portion, a third tapered portion and a second metering portion, said vent portion comprising (1) a cylindrical section having a decreased diameter relative to a diameter of said screw at said first metering and second metering portions and (2) a flight of screw thread removed to form a mixing space adjacent to said lead-in portion, said first tapered plasticating portion comprising a cylindrical section of gradually increasing diameter as it extends toward said first metering portion, said first metering portion comprising a cylindrical section of constant diameter and extending from said first tapered plasticating portion toward said second tapered portion, said second tapered portion comprising a cylindrical section of gradually decreasing in diameter as it extends from said first metering portion toward said vent portion, said third tapered portion comprising a cylindrical section of gradually increasing diameter as it extends from said vent portion toward said second metering portion;

said second metering portion comprising a cylindrical section of constant diameter; and a plurality of stirring blades in said mixing space extending radially around the circumference of said decreased diameter cylindrical section of said screw toward an inside surface of said cylinder for stirring said foaming agent into said plastic material as said plastic material is moved through said first cavity; and a second-stage extruder unit, connected to said first-stage extruder unit, for receiving a mixture of said plastic material and said foaming agent and further propelling and mixing said mixture, including:

a second cylinder, said second cylinder defining a second cavity;

a second screw extending through said second cavity for propelling said mixture through said second cavity and further mixing said mixture as said second screw rotates; and a combination of a nipple and a die, located at the end of said second-stage extruder unit, for receiving said mixture from said second-stage extruder unit and applying said mixture onto a central conductor.

* * * * *